United States Patent Office 3,657,319
Patented Apr. 18, 1972

3,657,319
α-AMINOALKYL-4-HYDROXY-3-CARBOALKOXY-AMINOBENZYL ALCOHOLS
Carl Kaiser, Haddon Heights, N.J., and Stephen T. Ross, Berwyn, Pa., assignors to Smith Kline & French Laboratories, Philadelphia, Pa.
No Drawing. Filed May 5, 1970, Ser. No. 34,893
Int. Cl. C07c *125/06*
U.S. Cl. 260—471 C                                    10 Claims

ABSTRACT OF THE DISCLOSURE

α-Aminoalkyl-4-hydroxy-3-carboalkoxyaminobenzyl alcohols having β-adrenergic stimulant activity, particularly as selective bronchodilators, are prepared from 3-amino-4-benzyloxyphenones by conversion to an isocyanate, reaction with a lower alkanol to give 3-carboalkoxyaminophenones, bromination of these phenones and treatment of the resulting α-bromo derivatives with an N-benzyl secondary amine, followed by catalytic hydrogenation to remove the benzyl groups and reduce the ketone moiety.

This invention relates to novel α-aminoalkyl-4-hydroxy-3-carboalkoxyaminobenzyl alcohols which have useful pharmacodynamic activity. More specifically the compounds of this invention have utility as β-adrenergic stimulants with relatively greater activity on respiratory smooth muscle than on cardiac muscle. Therefore these compounds have direct bronchodilator action with minimal cardiac stimulation as demonstrated in standard pharmacological test procedures.

Two in vitro test systems used for determining selective β-stimulant activity are: (1) effect on spontaneous tone of guinea pig tracheal chain preparations as a measure of β-stimulant (direct relaxant) effect on airway smooth muscle, and (2) effect on rate of spontaneously beating right atria of the guinea pig as a measure of β-stimulant effect on cardiac muscle. The compounds of this invention have selective bronchodilating properties since they are active in (1) above at a dose lower than is required in (2) above resulting in a positive separation ratio.

The compounds of this invention are represented by the following general structural formula:

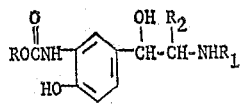

FORMULA I in which:

R represents lower alkyl of from 1 to 5 carbon atoms, straight or branched chain;

$R_1$ represents a branched chain lower alkyl group of from 3 to 5 carbon atoms, a cycloalkyl or cycloalkylmethyl group, the cycloalkyl moiety having from 3 to 6 carbon atoms, or

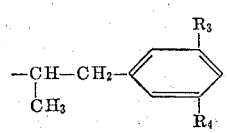

$R_2$ represents hydrogen, methyl or ethyl; and
$R_3$ and $R_4$ represent hydrogen, hydroxy or methoxy.

Preferred compounds of this invention are represented by Formula I above when R is ethyl; $R_1$ is isopropyl, t-butyl, cyclopropyl, cyclopentyl or 3,4-dimethoxyphenylisopropyl; and $R_2$ is hydrogen.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicylic, methanesulfonic, ethanedisulfonic, acetic, oxalic, propoinic, tartaric, salicylic, citric, glyconic, aspartic, stearic, palmitic, itaconic, glycolic, p-aminobenzoic, glutamic, benzenesulfonic, hydrochloric, hydrobromic, sulfuric, cyclohexyl sulfamic, phosphoric and nitric acids.

Further the compounds of this invention contain at least one asymmetric carbon atom which is resolvable into *d*- and *l*- optical isomers. When $R_2$ in Formula I is not hydrogen another asymmetric carbon atom is formed and these compounds (diastereoisomers) are designated as erythro- and threo- isomers which may be resolved as *d*, *l* optical isomers. Unless otherwise specified in the description and accompanying claims, it is intended to include all isomers, whether separated or mixtures thereof.

A preferred compound of this invention is -(t-butylaminomethyl) - 3-carboethoxyamino-4-hydroxybenzyl alcohol which relaxes the spontaneous tone of guinea pig tracheal ring preparation at an $ED_{50}$ of 0.02 mcg./ml. while increasing the rate of contraction of guinea pig right atria at an $ED_{25}$ of 0.1 mcg./ml. These activities give an absolute separation ratio of 5 which is a 10-fold improvement when compared to the corresponding activity of *d*, *l*-isoproterenol (absolute separation ratio=0.5) in similar in vitro preparations.

The compounds of this invention are prepared as shown in the following sequence of reactions:

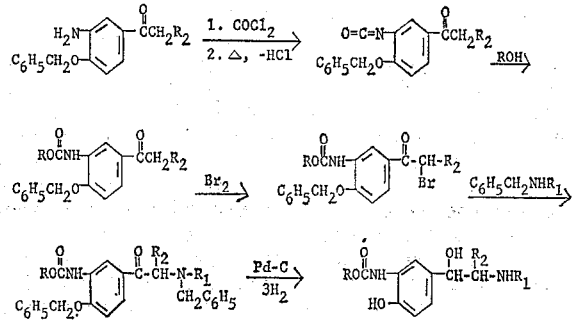

FORMULA II in which R, $R_1$ and $R_2$ are as defined in Formula I. Thus, as shown above, an aminobenzyloxyphenone is treated with phosgene and then heated to give the isocyanate which is reacted with a lower alkanol to yield the carboalkoxyaminophenone derivative. The latter is treated with bromine and the resultant α-bromophenone is reacted with an N-benzylamine to give the corresponding α-benzylaminophenone. This derivative is hydrogenated catalytically, preferably with palladium-on-carbon, to give the debenzylated carboalkoxyaminobenzyl alcohol product.

It will be appreciated that the benzyl ether derivatives of Formula II in the above reaction sequence are useful intermediates and as such form a part of this invention.

The aminobenzyloxyphenones used as starting materials herein are known and are prepared as follows: a 4-hydroxyphenone is nitrated with red fuming nitric acid at —25° C. to yield the 4-hydroxy-3-nitrophenone which is reacted with benzyl chloride in the presence of potassium hydroxide to give the 4-benzyloxy-3-nitrophenone and the latter is reduced to the 3-amino-4-benzyloxyphenone using Raney nickel and hydrazine hydrate or platinum oxide and hydrogen.

The compounds of this invention may be administered orally or parenterally in conventional dosage unit forms such as tablets, capsules, injectables or the like, by incorporating the appropirate dose of a compound of Formula I, with carriers according to accepted pharmaceutical practices.

The foregoing is a general description of how to prepare the compounds of this invention. The following examples illustrate the preparation of specific compounds having β-adrenergic stimulant activity. However, this should be construed as a limitation of the invention since appropriate variations in the starting materials will produce other products set forth hereinabove.

EXAMPLE 1

A stirred solution of 40 g. (0.41 m.) of phosgene in 150 ml. of toluene is held at 25° C. with a cooling bath while a mixture of 25.2 g. (0.105 m.) of 3-amino-4-benzyloxy-acetophenone and 220 ml. of toluene are added slowly. The mixture is heated to reflux and continued for 30 minutes. Nitrogen is passed through the mixture and then concentrated in vacuo to give a crystalline isocyanate, M.P. 105–106° C.

A solution of the isocyanate (12.5 g.) in 170 ml. of ethanol is refluxed for two hours. The reaction mixture is concentrated and the residue is triturated with hexane to give the crystalline 4-benzyloxy-3-carboethoxyaminoacetophenone, M.P. 84–86° C.

To a stirred solution of 1.6 g. (0.005 m.) of 4-benzyloxy-3-carboethoxyaminoacetophenone in 20 ml. of chloroform and 0.2 g. of benzoyl peroxide is added 0.84 g. (5% excess) of bromine in 2 ml. of chloroform. The mixture is stirred at room temperature for about 45 minutes in the presence of a spotlight and the solution is concentrated in vacuo at 35–45° C. to give 4-benzyloxy-α-bromo-3-carboethoxyaminoacetophenone, M.P. 98–100° C. The latter (3.92 g., 0.01 m.) is dissolved in 30 ml. of acetonitrile and 3.3 g. (0.02 m.) of N-benzyl-N-t-butylamine is added. The mixture is stirred and refluxed for two hours, then it is cooled and diluted with ether. Crystalline N-benzyl-N-t-butylamine hydrobromide is filtered. The filtrate is acidified with ethereal hydrogen chloride and ether is added to give 4 - benzyloxy - α - (N-benzyl-N-t-butylamino)-3-carboethoxyaminoacetophenone hydrochloride, M.P. 138–143° C.

A mixture of 2.6 g. (0.005 m.) of 4-benzyloxy-α-(N-benzyl-N-t-butylamino) - 3 - carboethoxyaminoacetophenone hydrochloride, 0.5 g. of 10% palladium-on-carbon and 100 ml. of ethanol is hydrogenated on the Parr apparatus at room temperature, using an initial pressure of 60 p.s.i. of hydrogen. After about 30 minutes hydrogen uptake is completed. The reaction mixture is filtered and the filtrate is concentrated in vacuo. The residue is crystallized with ether-ethanol to give α-(t-butylaminomethyl)-3-carboethoxyamino-4-hydroxybenzyl alcohol hydrochloride, M.P. 218–219° C.

Similarly, refluxing a solution of the isocyanate in methanol and proceeding wtih the ensuing reactions as described above yields the corresponding 3-carbomethoxyamino derivatives and the final product α-(t-butylaminomethyl)-3-carbomethoxyamino - 4 - hydroxybenzyl alcohol hydrochloride, M.P. 215–216.5° C.

Refluxing a solution of the isocyanate in isopropanol and continuing as described above yields ultimately α-(t-butylaminomethyl) - 3 - carboisopropoxyamino) - 4 - hydroxybenzyl alcohol hydrochloride, M.P. 199–200° C.

EXAMPLE 2

A solution of 2.4 g. (0.008 m.) of the isocyanate prepared in Example 1 in 50 ml. of methanol is refluxed for two hours and the reaction mixture is concentrated to give 4-benzyloxy-3-carbomethoxyaminoacetophenone, M.P. 104–106.5° C.

To a suspension of 1.5 g. of the above carbomethoxyaminoacetophenone in 20 ml. of chloroform and 0.2 g. of benzoyl peroxide is added 0.84 g. (about 5% excess) of bromine in 2 ml. of chloroform. The reaction mixture is stirred at room temperature for 45 minutes and then concentrated in vacuo at 40–50° C. to give 4-benzyloxy-α-bromo - 3 - carbomethoxyaminoacetophenone, M.P. 102–104° C.

A mixture of 1.8 g. of 4-benzyloxy-α-bromo-3-carbomethoxyamino-acetophenone, 1.5 g. of N-benzylisopropylamine and 20 ml. of acetonitrile is stirred and refluxed for two hours, then it is cooled and diluted with ether. The reaction mixture is filtered (N-benzylisopropylamine hydrobromide) and the filtrate acidified. The solid is filtered, dissolved in 100 ml. of ethanol, 1 g. of palladium-carbon is added and the mixture is hydrogenated on a Parr shaker (initial hydrogen pressure 60 p.s.i. and room temperature). The mixture is filtered, after hydrogen uptake is completed (about 45 minutes) and the filtrate is concentrated in vacuo. The residue is crystallized from ethanol-ether to give 3-carbomethoxyamino-4-hydroxy-α-(isopropylaminomethyl)-benzyl alcohol hydrochloride.

Similarly, employing n-butanol in the initial reaction with the isocyanate and proceeding in the above sequence of reactions yields the corresponding 3-carbobutoxyamino derivatives and the product 3-carbobutoxyamino-4-hydroxy-α-(isopropylaminomethyl)-benzyl alcohol.

Reacting isopropanol with the isocyanate and following through as above furnishes as the final product, 3-carboisopropoxyamino - 4 - hydroxy - α - (isopropylaminomethyl)-benzyl alcohol.

EXAMPLE 3

Following the procedures outlined in Example 1, 4-benzyloxy - α - bromo-3-carboethoxyaminoacetophenone is reacted with N-benzylcyclopentylamine to give 4-benzyloxy-α-(N-benzylcyclopentylamino) - 3 - carboethoxyaminoacetophenone hydrochloride. Similar hydrogenation over palladium-on-carbon gives 3-carboethoxyamino-α-(cyclopentylaminomethyl)-4-hydroxy alcohol.

Reacting 4-benzyloxy - α - bromo - 3 - carboethoxyaminoacetophenone with N-benzyl-3,4-dimethoxyphenylisopropylamine followed by hydrogenation furnishes the product 3 - carboethoxyamino - α - [2-(3,4-dimethoxyphenyl)-methylethylaminomethyl]-4-hydroxy alcohol.

Similarly, employing N-benzylcyclopropylmethylamine in the above reaction followed by hydrogenation there is obtained 3-carboethoxyamino - α - (cyclopropylmethylaminomethyl)-4-hydroxybenzyl alcohol.

EXAMPLE 4

Following the procedures of Example 2, 4-benzyloxy-α-bromo - 3 - carbomethoxyaminoacetophenone is reacted with N-benzylphenylisopropylamine to give 4-benzyloxy-α-(N-benzylphenylisopropylamino) - 3 - carbomethoxyaminoacetophenone which is hydrogenated to yield 3-carbomethoxyamino - 4 - hydroxy - α - (2-phenyl-1-methylethylaminomethyl)-benzyl alcohol.

Similarly, reaction of the 4-benzyloxy-α-bromoacetophenone with 3,4 - dibenzyloxyphenylisopropyl amine yields as the final product 3-carbomethoxyamino-α-[2-(3,4-dihydroxyphenyl) - 1 - methylethylaminomethyl]-4-hydroxy benzyl alcohol.

EXAMPLE 5

A solution of 40 g. of phosgene in 150 ml. of toluene at 25° C. is treated with 28.1 g. of 3-amino-4-benzyloxybutyrophenone in 250 ml. of toluene. The mixture is refluxed for 30 minutes and concentrated in vacuo to give the isocyanate. The latter (31.2 g.) is dissolved in 500 ml. of ethanol and the solution is refluxed for two hours to yield 4-benzyloxy-3-carboethoxyaminobutyrophenone.

To a stirred solution of 6.4 g. of the above prepared 3-carboethoxyaminobutyrophenone in 125 ml. of chloroform is added 3.2 g. of bromine. After stirring at room temperature for about 45 minutes the reaction mixture is concentrated in vacuo at 25–30° C. The 4-benzyloxy-α-bromo-3-carboethoxyaminobutyrophenone thus obtained is dissolved in 100 ml. of acetonitrile and 9.8 g. of N-benzyl-N-t-butylamine is added. The mixture is refluxed for two hours, cooled and filtered. The filtrate is acidified with ethereal hydrogen chloride to give 4-benzyloxy-α-(N-benzyl - N - t-butylamino) - 3 - carboethoxyaminobutyrophenone hydrochloride.

A solution of 11.7 g. of the above prepared hydrochloride in 125 ml. of methanol and 25 ml. of water is added to a suspension of 1.5 g. of 10% palladium-on-carbon in 10 ml. of water. The mixture is hydrogenated on the Parr apparatus at room temperature to yield α-(1-t-butylaminopropyl) - 3 - carboethoxyamino - 4 - hydroxybenzyl alcohol hydrochloride.

Similarly, by employing 3-amino-4-benzyloxypropiophenone in the initial reaction with phosgene and following through the above sequence of reactions there is obtained the corresponding product, α - (1 - t - butylamino-3-carboethoxyamino-4-hydroxybenzyl alcohol hydrochloride.

EXAMPLE 6

Employing the procedures of Example 2, 4-benzyloxy-α-bromo - 3 - carbomethoxyaminoacetophenone is reacted with N-benzyl-4-benzyloxyphenylisopropyl amine to give 4-benzyloxy-α-(N-benzyl - 4 - benzyloxyphenylisopropylamino)-3-carbomethoxyaminoacetophenone which is hydrogenated to yield 3-carbomethoxyamino-4-hydroxy-α-[2-(4-hydroxyphenyl) - 1 - methylethylaminomethyl]-4-hydroxybenzyl alcohol.

What is claimed is:
1. A chemical compound of the formula:

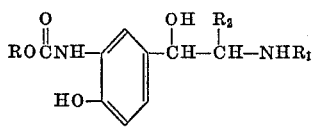

or a pharmaceutically acceptable acid addition salt of said compound, wherein:
R is straight or branched chain lower alkyl of from 1 to 5 carbon atoms;
$R_1$ is branched chain lower alkyl or from 3 to 5 carbon atoms, cycloalkyl or cycloalkylmethyl, the cycloalkyl moiety having from 3 to 6 carbon atoms, or

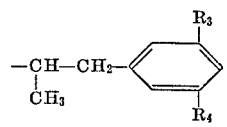

$R_2$ is hydrogen, methyl or ethyl; and
$R_3$ and $R_4$ are hydrogen, hydroxy or methoxy.

2. A chemical compound according to claim 1 in which R is ethyl.
3. A chemical compound according to claim 2 in which $R_2$ is hydrogen.
4. A chemical compound according to claim 3 in which $R_1$ is t-butyl, being the compound α-(t-butylaminomethyl)-3-carboethoxyamino-4-hydroxybenzyl alcohol.
5. A chemical compound according to claim 3 in which $R_1$ is cyclopentyl, being the compound 3-carboethoxyamino-(cyclopentylaminomethyl)-4-hydroxybenzyl alcohol.
6. A chemical compound according to claim 1 in which R is methyl and $R_2$ is hydrogen.
7. A chemical compound according to claim 6 in which $R_1$ is isopropyl, being the compound 3-carbomethoxyamino-4-hydroxy-α-(isopropylaminomethyl)-benzyl alcohol.
8. A chemical compound according to claim 2 in which $R_2$ is methyl or ethyl.
9. A chemical compound according to claim 8 in which $R_2$ is ethyl and $R_1$ is t-butyl, being the compound α-(1-t-butylaminopropyl)-3 - carboethoxyamino - 4 - hydroxybenzyl alcohol.
10. A chemical compound according to claim 8 in which $R_2$ is methyl and $R_1$ is t-butyl, being the compound α-(1-t-butylaminoethyl) - 3 - carboethoxyamino - 4 - hydroxybenzyl alcohol.

No references cited.

JAMES A. PATTEN, Primary Examiner
R. S. WEISSBERG, Assistant Examiner

U.S. Cl. X.R.
260—343.7, 453 PH, 453 AR; 424—300